(12) United States Patent
Nibarger et al.

(10) Patent No.: US 7,403,359 B1
(45) Date of Patent: Jul. 22, 2008

(54) METHOD FOR PROTECTING AGAINST CORROSION IN A GMR SENSOR BY PROVIDING A PROTECTIVE COATING OVER AN END OF A COPPER LAYER SPACED APART FROM A DETECTION SURFACE BY A SPECIFIED DIMENSION

(75) Inventors: John P. Nibarger, Superior, CO (US); Herbert House, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 476 days.

(21) Appl. No.: 11/177,606

(22) Filed: Jul. 8, 2005

(51) Int. Cl.
*G11B 5/36* (2006.01)
(52) U.S. Cl. .................................. 360/324.1
(58) Field of Classification Search .... 360/324.1–324.2
See application file for complete search history.

(56) References Cited

U.S. PATENT DOCUMENTS 6,989,974 B2 * 1/2006 Tetsukawa et al. ....... 360/324.1
7,174,622 B2 * 2/2007 Meyer et al. ............. 29/603.14

* cited by examiner

*Primary Examiner*—Allen Heinz
(74) *Attorney, Agent, or Firm*—Brooks Kushman P.C.

(57) ABSTRACT

A method is provided for inhibiting corrosion in a layer of Cu or other material in a GMR sensor, wherein the GMR sensor may be used in a magnetic data storage system such as a tape drive system to substantially improve read head sensitivity. The GMR sensor comprises stacked layers of ferromagnetic and non-magnetic materials. In one useful embodiment, a layer of Cu material is positioned between first and second layers of a specified ferromagnetic material, such as CoFe. Respective end surfaces of the Cu layer and first and second CoFe layers are initially located in substantially co-planar relationship with one another, in a common plane. The method further comprises etching the Cu layer to remove an amount of material therefrom. A new end surface is thus formed in the Cu layer, wherein the new end surface is selectively spaced apart from the common plane. A protective coating is then applied to the new end surface of the Cu layer, to inhibit corrosion of such layer. Usefully, a pole tip recession is formed at the ends of the first and second CoFe layers.

8 Claims, 4 Drawing Sheets

METHOD FOR PROTECTING AGAINST CORROSION IN A GMR SENSOR BY PROVIDING A PROTECTIVE COATING OVER AN END OF A COPPER LAYER SPACED APART FROM A DETECTION SURFACE BY A SPECIFIED DIMENSION

BACKGROUND OF THE INVENTION

1. Field of the Invention

The invention disclosed and claimed herein generally pertains to a method for applying a protective coating to at least one layer of a giant magneto-resistive (GMR) sensor, to inhibit corrosion. More particularly, the invention pertains to a method of the above type wherein a protective coating is applied to a layer of copper or copper alloy sandwiched between other layers of material, such as an alloy of cobalt and iron. Even more particularly, the invention pertains to a method of the above type wherein the copper and cobalt-iron layers are included in a stack of layers comprising a sensor for a read head of a magnetic media data storage system.

2. Description of the Related Art

The continuing requirement to increase storage densities of magnetic media data storage systems, such as magnetic tape drive systems, is increasing the need for more sensitive magneto-resistive sensors. Currently, anisotropic magneto-resistive (AMR) sensors are being employed in the read heads of such systems. In AMR sensors, corrosion generally has not been a significant issue associated with their use. In these sensors corrosion has been mitigated through the use of half-power storage, which keeps the sensor material warm when not in use. This, in turn, reduces the amount of corrosive gases that are adsorbed onto the sensor material. However, the maximum change in sensor resistance ($\Delta R/R$) for an AMR sensor is only 2%. As is known by those of skill in the art, $\Delta R/R$ is a metric of total signal available from the sensor, and thus indicates the sensitivity of the sensor.

In the effort to increase data storage density in magnetic media, it has been recognized that the $\Delta R/R$ of a read sensor may be significantly increased by using a device known as a giant magneto-resistive (GMR) sensor. The $\Delta R/R$ for a GMR sensor is 10-20%. However, a major drawback associated with this type of sensor has been its increased susceptibility to corrosion. A GMR sensor generally comprises a stack of layers, wherein a central layer is formed of copper or a copper alloy. Hereinafter, for convenience, the term "Cu" is used to mean or refer to the copper or copper alloy material forming such central layer. Other layers are formed of materials such as alloys of platinum-manganese (PtMn), cobalt-iron (CoFe), nickel-iron (NiFe), ruthenium (Ru) and tantalum (Ta). The most susceptible layer to corrosion is the crucial Cu layer. The Cu layer carries substantial electric current, and the GMR effect occurs at the interface of the copper and adjoining layers, which usually are comprised of a cobalt-ferrite alloy (CoFe).

Several solutions to the Cu corrosion problem are available in the prior art. One such solution is to place a protective layer on top of the stack of sensor layers, to prevent corrosion of any of the layers. However, at least two problems exist with this solution: the protective layer can be worn off by the moving magnetic tape or other media, and the protective layer, when present, introduces spacing loss which can reduce the sensor signal and resolution to unacceptable levels.

A second prior art solution is to bury the GMR sensor within the read head of the tape drive system. This is commonly done in either a yoke structure or in a flux guide structure. However, a number of problems also arise with these solutions. Signal strength is reduced, since yoke and flux guide designs have a maximum efficiency of only 50%, with efficiency usually being closer to 20-30%. Also, the manufacture of the yoke structure tends to involve substantial complexity.

The above prior art solutions to corrosion of the Cu layer in a GMR sensor are further described hereinafter, in connection with FIGS. 3-5. It would clearly be of great benefit to provide a process for protecting the vulnerable Cu layer of a GMR sensor that did not introduce additional spacing losses between the media and the active layer of the sensor.

SUMMARY OF THE INVENTION

The invention generally provides a method for inhibiting corrosion in a layer of Cu or other material in a GMR sensor. The GMR sensor may be used in a magnetic media data storage system, such as a magnetic tape drive system, to substantially improve tape read head sensitivity. However, it is not intended to limit the GMR sensor of the invention to such application. In accordance with the method, the Cu layer is selectively etched, and a protective coating is then applied to the Cu layer. One useful embodiment of the invention is directed to a method for providing a GMR sensor, wherein a layer of Cu material is positioned between first and second layers of a specified ferromagnetic material, such as CoFe. The Cu layer is sandwiched between the first and second layers, and respective end surfaces of the Cu and first and second layers are initially located in substantially co-planar relationship with one another, in a common plane. The method further comprises removing an amount of material from the Cu layer to form a new end surface thereof, wherein the new end surface is selectively spaced apart from the common plane. A protective coating is then applied to the new end surface of the Cu layer, to inhibit corrosion of such layer.

DETAILED DESCRIPTION OF THE PREFERRED EMBODIMENT

Figure 1:
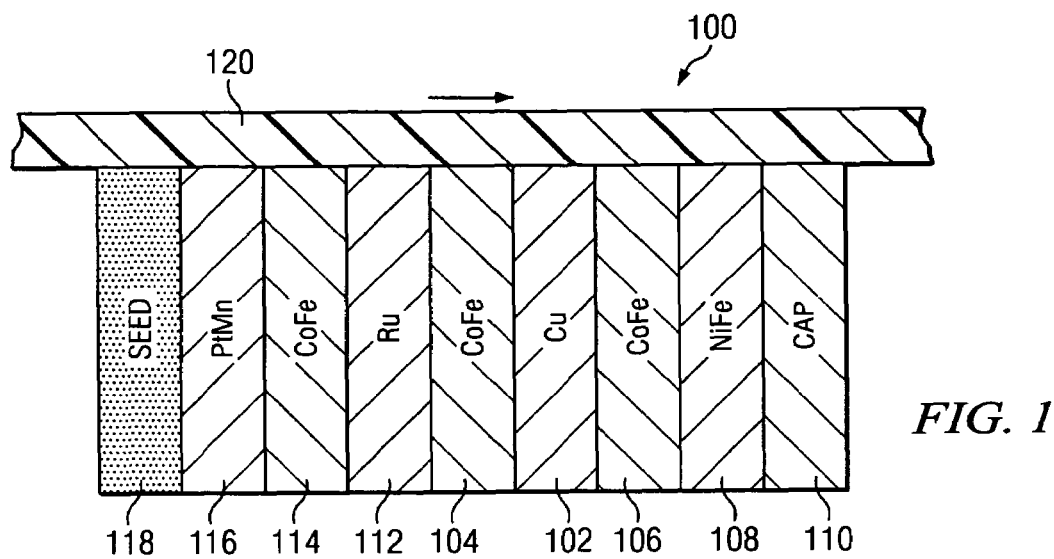
FIG. 1 is a schematic view showing a GMR sensor for processing to inhibit corrosion, in accordance with an embodiment of the invention.

Referring to FIG. 1, there is shown a giant magneto-resistive (GMR) sensor 100, comprising a number of layers that are stacked together. Respective layers are formed of different ferromagnetic, antiferromagnetic, and non-magnetic materials, as described hereinafter. Of particular importance is non-magnetic Cu layer 102, formed of copper or a copper alloy such as CuAg or CuAu. The Cu layer 102 is sandwiched between ferromagnetic CoFe layers 104 and 106. Layers 104 and 106 may comprise, for example, a cobalt-iron alloy such as $Co_{90}Fe_{10}$.

Referring further to FIG. 1, there is shown sensor 100 referred to as a spin valve. The spin valve is comprised of a stack of ferromagnetic, antiferromagnetic, and non-magnetic materials. A PtMn layer 116 with the appropriate seed 118 provides antiferromagnetic exchange coupling of the pinned layer. A pinned layer is comprised of a CoFe pinned layer 114, a Ru spacer layer 112, and a CoFe reference layer 104. The thickness of the Ru spacer layer is chosen so that antiferromagnetic coupling occurs between the pinned 114 and reference 104 CoFe layers. This structure is referred to as a synthetic antiferromagnet. The next layer is the crucial Cu nonmagnetic spacing layer 102. The next two layers, $Co_{90}Fe_{10}$ 106 and $Ni_{80}Fe_{20}$ 108 compromise the free layer. Finally a protective capping layer 110 is used to protect the films during further photolithography and processing steps.

It will, of course, be appreciated that other embodiments of the invention may comprise stacked layers of other materials than those shown, and in other combinations, as will occur to those of skill in the art. Sensor 100 comprises a device known as a spin valve, which achieves a large resistance change depending on the relative orientation of two ferromagnetic layers; the pinned CoFe reference layer 104 and the CoFe free layer 106. In order for the ferromagnetic layers to have independent magnetizations, they must be magnetically decoupled by a non-magnetic spacer layer, such as Cu layer 102. The non-magnetic spacer layer must have the appropriate band structure to allow spin dependent scattering at the reference and free layer interfaces. Cu, Au, and Ag as well as Cu alloys have been shown to provide this property.

FIG. 1 further shows magnetic data storage tape 120 positioned to travel along GMR sensor 100, in close proximity thereto. As is known by those of skill in the art, the resistance of a device such as GMR sensor 100 changes when it experiences or is exposed to a magnetic field. Thus, by passing an electric current through the GMR sensor 100, the sensor can be used to read information that is magnetically stored on the tape 120. As the tape moves past sensor 100, a pattern of magnetic flux is applied to sensor 100 by the tape 120. This flux pattern continually changes, in accordance with the information stored on the tape. Accordingly, the resistance of the GMR sensor varies in corresponding relationship with the changes in flux. It follows that these variations represent the stored data, and can be readily detected by monitoring the current that flows through the sensor. In a very useful arrangement, data is stored on the magnetic tape in the form of successive digital bits. Different transition patterns of flux emitted from the tape represent digital 1's and 0's, respectively.

When tape data storage density is increased, each individual stored data bit is allocated a smaller amount of the tape or other storage media. As a result, the media provides less flux for each bit, for use by a sensor in detecting flux transitions. Accordingly, the higher ΔR/R ratio available with GMR sensors has caused such sensors to have great appeal, for use in read heads for magnetic data storage media. However, as stated above, GMR sensors, and particularly the crucial Cu layer thereof, tend to be very susceptible to corrosion. The Cu layer carries approximately half of the current, and the GMR effect occurs at the interface of the Cu layer 102 and CoFe layers 104 and 106.

Figure 2:
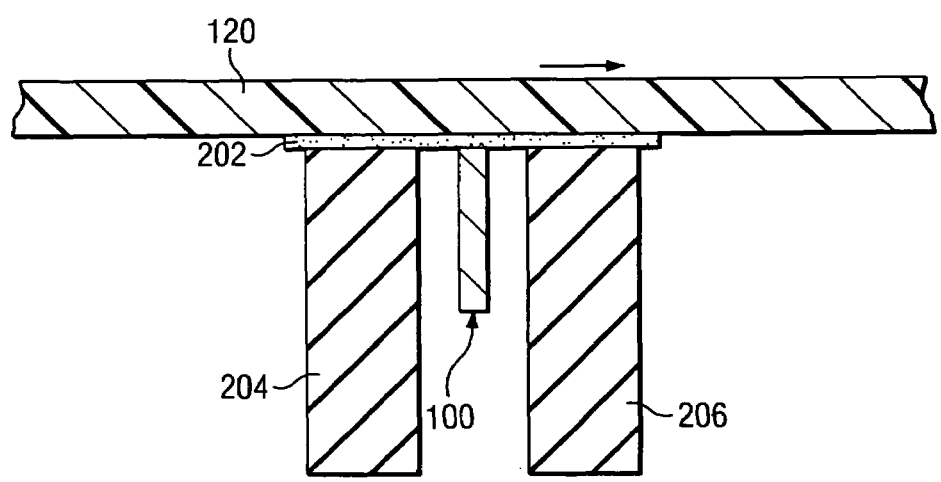
FIGS. 2-4 are schematic views showing respective prior art approaches for reducing corrosion in a GMR sensor.

FIG. 2 shows one of the prior art approaches for reducing corrosion in a GMR sensor, wherein a protective layer 202 is placed on top of the stacked layers that collectively form GMR sensor 100. FIG. 2 shows the same view of sensor 100 as shown in FIG. 1, but without differentiating the respective layers. However, as previously stated, the moving storage tape 120 may eventually wear away the protective layer 202. Moreover, the protective layer 202 necessarily spaces the sensor 100 away from the magnetic tape 120. Thus, a spacing loss is introduced, which can reduce the amount of flux that is detectable at sensor 100 and also the resolution of sensor 100, to unacceptable levels.

FIG. 2 further shows magnetic field shields 204 and 206, positioned to prevent GMR sensor 100 from being affected by stray magnetic fields.

Figure 3:
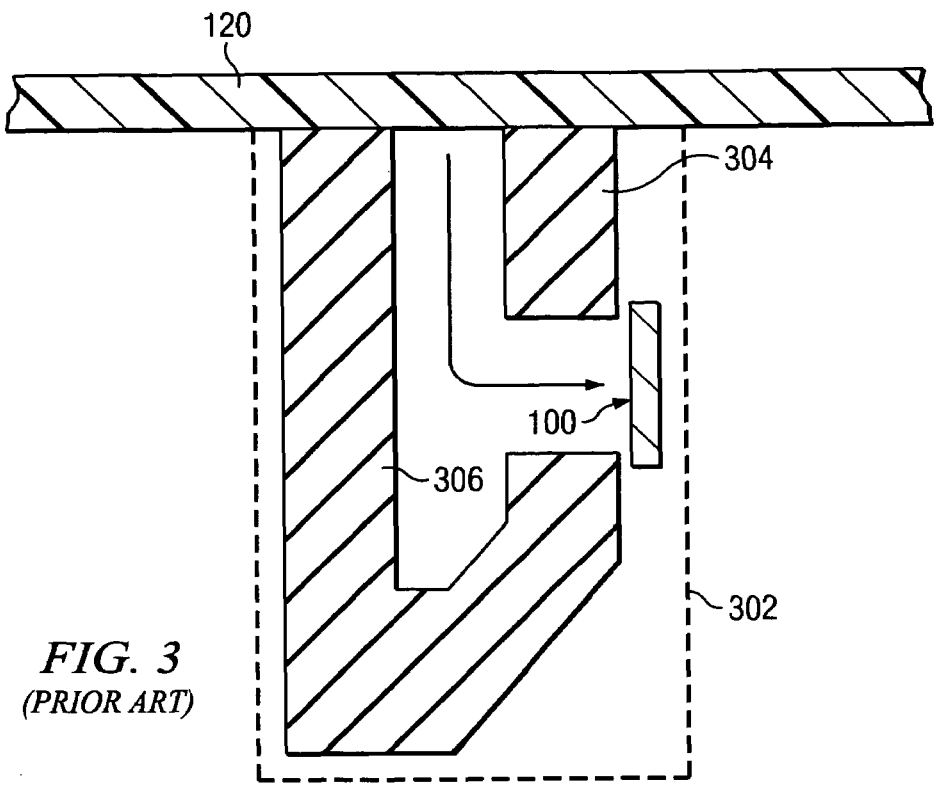

Referring to FIG. 3, there is shown an alternative prior art approach to reducing corrosion in a GMR sensor 100. In the arrangement of FIG. 3, the sensor is placed well within the tape read head 302, and can thus be protected from a surrounding corrosive environment. A yoke structure, comprising components 304 and 306, is provided in read head 302 to direct flux from the magnetic storage tape 120 to sensor 100. The yoke structure provides a magnetic flux path from the tape 120 through yoke 304, through sensor 110, through yoke 306, and returning to tape 120. However, prior art yoke designs generally have a maximum efficiency of 50%, and efficiency is typically closer to 20-30%. Accordingly, signal strength is substantially reduced at the GMR sensor. Moreover, the yoke structure involves significant manufacturing complexity.

Figure 4:
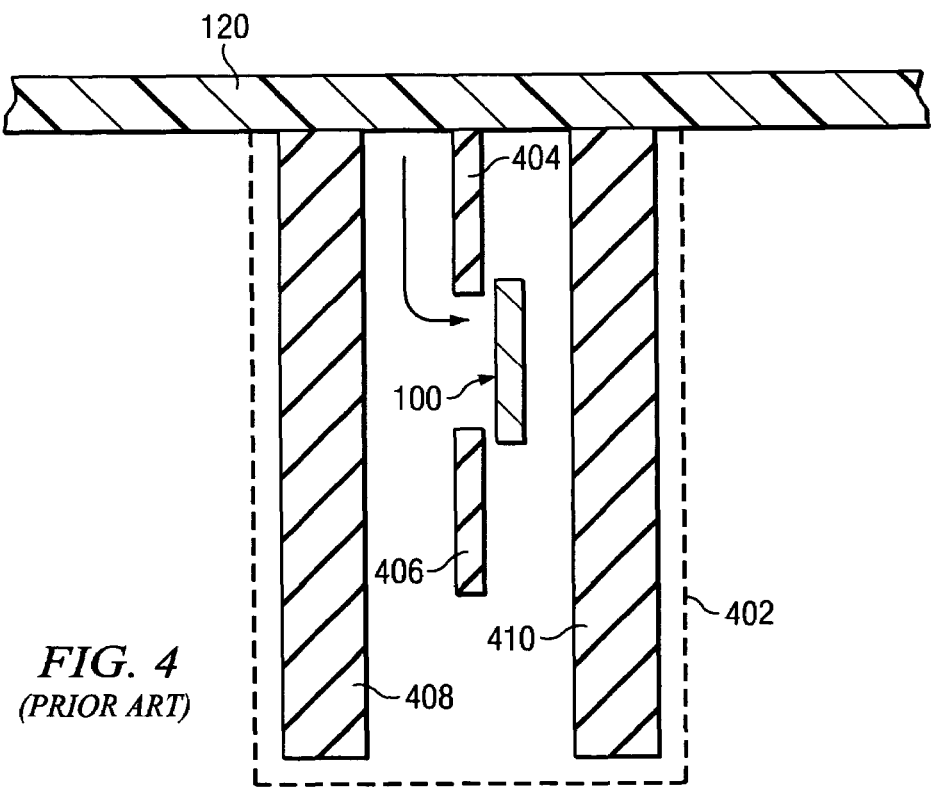

FIG. 4 is a further prior art approach, similar to the yoke structure approach of FIG. 3. FIG. 4 shows the sensor 100 again placed within a tape head 402. Components 404 and 406 are flux guide components, positioned to direct magnetic flux from storage tape 120 to sensor 100. However, as with the yoke structure, signal strength at sensor 100 is significantly reduced, since efficiency is no greater than 50% and is usually on the order of 20-30%. FIG. 4 shows the sensor 100 and flux guide components 404 and 406 positioned between magnetic field shields 408 and 410.

Figure 5A:
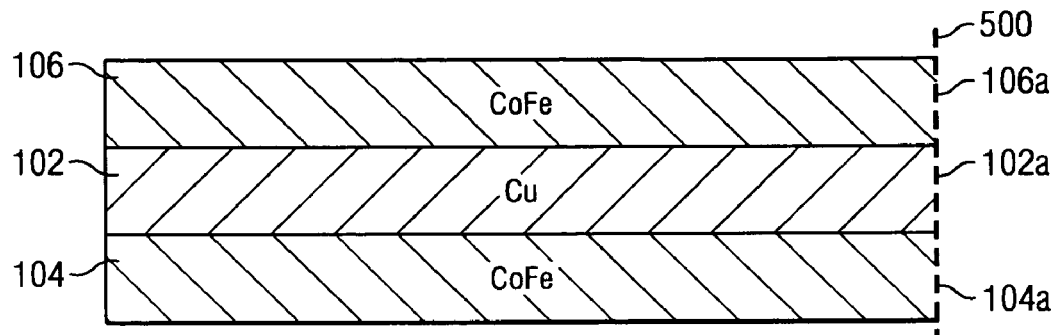
FIGS. 5A-D are views illustrating successive process steps applied to the GMR sensor of FIG. 1, in implementing an embodiment of the invention.

Referring to FIG. 5A, there is shown Cu layer 102 of sensor 100 initially positioned between CoFe layers 104 and 106, as described above. Moreover, the layers are respectively positioned so that an end surface 102a of Cu layer 102 is in co-planar relationship with end surfaces 104a and 106a, of CoFe layers 104 and 106, respectively. More particularly, each of the ends 102a, 104a, and 106a lies in a common plane 500. This plane is the plane of the bearing surface for storage tape 120, as tape 120 moves over sensor 100. As shown by FIG. 1, this bearing surface is provided by the support collectively furnished by the ends of respective layers of sensor 100. Cu layer 102 usefully has a thickness of 30 Angstroms, and CoFe layers 104 and 106 each have a thickness of 40 Angstroms.

Figure 5B:
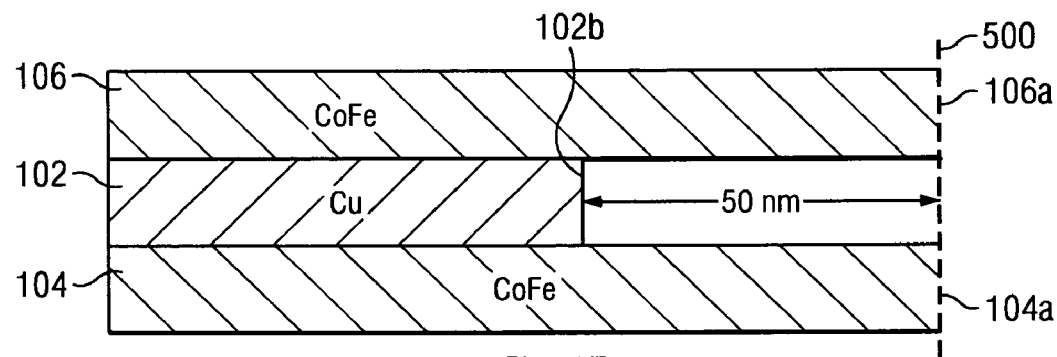
Figure 5C:
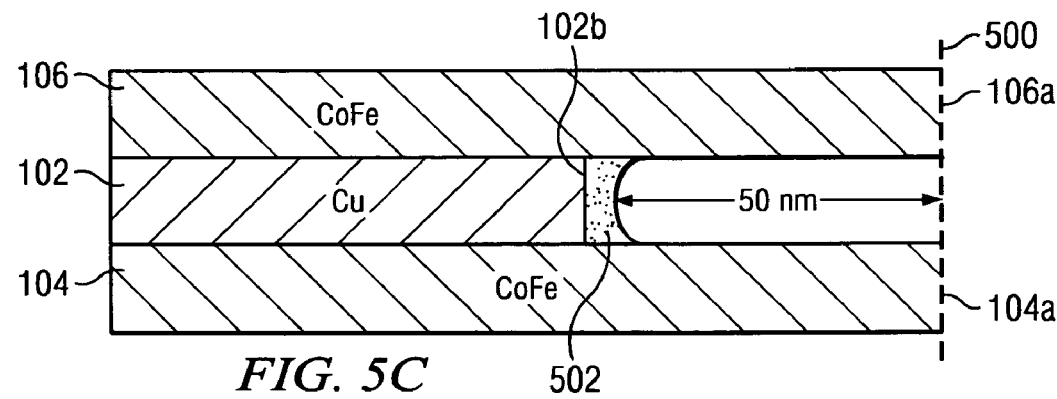
Figure 5D:
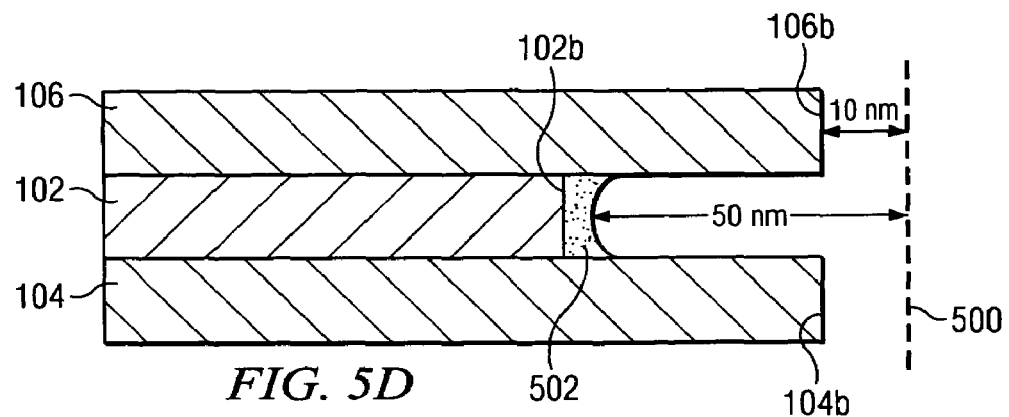

For ease and simplicity of illustration, FIG. 5A, as well as FIGS. 5B-D, do not show the layers 108-118 of sensor 100. Such layers are affected only by the lapping step described hereinafter in FIG. 5D Referring to FIG. 5B, there is shown Cu layer 102, wherein layer 102 has been specifically etched to remove 50 nanometers (nm) of material therefrom. Accordingly, layer 102 is provided with a new end surface 102b, which is spaced apart from the plane 500 by 50 nm, and will thus be spaced 50 nm from tape 120 when the tape moves over the sensor 100. In other embodiments of the invention, this spacing could be other values selected from a range between 30 nm and 100 nm.

A number of Cu specific etchants are currently available for use in removing the Cu material. These etchants include, for example, sodium persulfate, dilute hydrochloric acid and dilute nitric acid. A Cu specific etchant will, of course, act to remove material only from the Cu layer, and not from adjacent layers of sensor 100 that are formed of other materials.

Referring to FIG. 5C, there is shown a layer of protective material 502 that is bonded specifically to surface 102b of Cu layer 102. The Cu layer is thereby sealed from air of the surrounding environment and protected from corrosion. A number of different materials could be used to form protective coating 502, depending at least partly on the technique selected to apply the protective coating. Several alternative techniques that would be particularly useful would be (1) mechanical entrainment; (2) electroplating; and (3) electroless plating.

In mechanical entrainment, it is simply necessary to provide material to cover over end surface 102b, in the space between CoFe layers 104 and 106. The material 502 may come from two sources during lapping. It could come from the removed material during lapping or be an additional material added during lapping.

Electrolytic plating may usefully be employed to apply protective coating 502, since approximately 50% of the electric current passing through the sensor 100 is in the Cu layer 102. The Cu layer would thus be used as an electrode in an electrolytic plating process, and an appropriate material having an affinity for copper, such as gold, could be plated onto Cu end surface 102b. If plating were to occur in an undesirable location, tape lapping, may be required to remove the unwanted material.

Electroless plating is a comparatively straightforward method, whereby a chemical coating is applied to end surface 102b, to provide protective coating 502. This could be either through a catalytic or immersion process. The protective coating could comprise one of a number of copper specific complexing compounds, such as benzotriazole (BTA), and chromate conversion coatings of a type generally used for corrosion protection. A BTA molecule is a planar molecule having a diameter on the order of 5 Angstroms. Accordingly, it is considered feasible to fit the BTA molecules onto the Cu layer 102, since such layer has a thickness on the order of 30 Angstroms.

Referring to FIG. 5D, there is shown a tape lap performed on CoFe layers 104 and 106. The tape lap is a process whereby small amounts of material are removed from the ends of layers 104 and 106, to form new end surfaces 104b and 106b, respectively. Usefully, the tape lap provides spacing on the order of 10 nanometers between end surfaces 104b and 106b and the plane 500 of the tape bearing surface. The tape lap of layers 104 and 106 set the contour for the tape bearing surface provided by sensor 100.

The tape lap of CoFe layers 104 and 106 also creates a pole tip recession of 10 nanometers. As is known by those of skill in the art, the CoFe material of layers 104 and 106 tends to be removed by passage of tape 120, whereby the ends of layers 104 and 106 gradually become spaced farther and farther from the tape. Accordingly, the signal level sensed by layers 104 and 106 tends to diminish over time, and periodic adjustment in signal reception capability is necessary. However, by providing the 10 nanometer spacing of layers 104 and 106 initially, the signal reception adjustment can likewise be made initially, and thus will not become a concern later on.

In another embodiment of the invention, the steps shown in FIGS. 5B and 5C could be applied to other sensitive layers as well. For example, the steric acid in the magnetic tape lubricant may electrochemically deplete cobalt at a faster rate than other materials used in the GMR sensor 100. Accordingly, a cobalt specific etchant could be used to remove a portion of material from CoFe layers 104 and 106. A protective coating could then be applied to such layers, in like manner with Cu layer 102. In fact, applying protective coatings to both Cu layer 102 and CoFe layers 104 and 106 would make the introduction of the magnetic tape to the Cu and CoFe surfaces easier, since the combined area thereof would be proportionally larger.

In a modification of the embodiment illustrated by FIGS. 5A-D, there could be an initial tape lap of Cu layer 102, before the Cu layer etch step. The etch step may or may not be followed by a final tape lap of the Cu layer.

Figure 6:
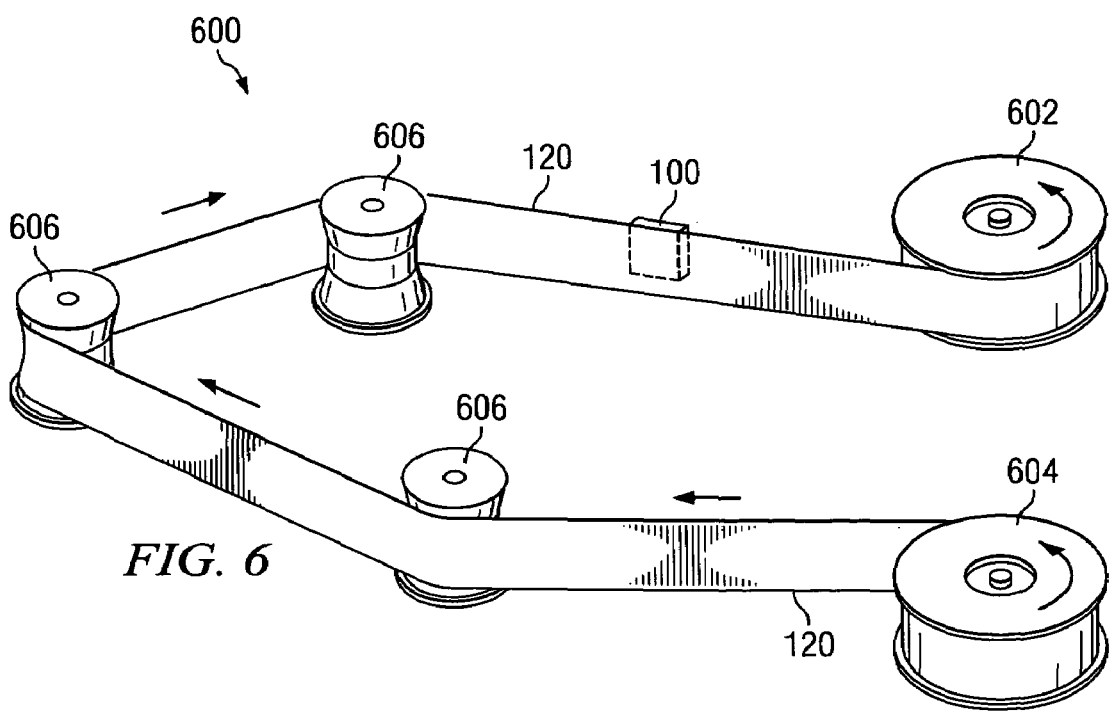
FIG. 6 is a perspective view showing a magnetic tape drive system having a GMR sensor processed as shown by FIGS. 5A-D.

Referring to FIG. 6, there is shown a tape drive system 600 disposed to move magnetic tape 120 past a tape read head comprising or including GMR sensor 100. Tape drive system 600 may be used for data storage in a computer system or the like. FIG. 6 shows system 100 having tape reels 602 and 604, driven by a motor or motors (not shown) to move tape media 120 along its path of travel or movement. Tape guides 606 are located at different positions along the path of travel, to accomplish respective direction changes.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A GMR sensor for reading data from a moving data storage tape in a tape drive system, said GMR sensor comprising:

multiple layers formed of selected ferromagnetic, antiferromagnetic, and non-magnetic materials, said layers positioned together in a stacked relationship with one another, the ends of at least some of said layers collectively defining a planar detection surface positioned in close relationship with said moving tape;

one of said layers comprising a Cu spacer layer positioned between first and second ferromagnetic layers of said sensor, said Cu layer having an end surface spaced apart from the plane of said detection surface by a spacing dimension of between 30 and 100 nm;

a protective coating being applied to said end surface of said Cu layer to inhibit corrosion thereof; and said first and second layers are formed of metallic ferromagnetic layers and/or alloys containing Ni, Fe, Co, or combinations thereof, selectively, and a pole tip recession on the order of 10 nm is formed at the ends of said first and second layers.

2. The sensor of claim 1, wherein:

said GMR sensor is disposed to carry an electric current, and to vary the resistance presented to said current in corresponding relationship to magnetic flux patterns directed to said sensor that represent data stored on said tape.

3. The sensor of claim 2, wherein:

said protective coating is applied to said Cu layer end surface by a technique selected from a group of techniques that include mechanical entrainment, electrolytic plating and electroless plating.

4. The sensor of claim 1, wherein:

the remainder of said layers comprise one or more materials selected from a group comprising metallic ferromagnetic layers containing Ni, Fe, Co, or combinations thereof and manganese based antiferromagnetic alloys, ruthenium and tantalum, the layers of said stack collectively comprising a spin valve device.

5. A method for reading data from a moving data storage tape in a tape drive system, said method comprising the steps of:

positioning a GMR sensor so that a planar detection surface of said GMR sensor is in close relationship with said moving tape, said GMR sensor comprising stacked layers respectively formed of selected ferromagnetic, anti-ferromagnetic and non-magnetic materials, one of said layers comprising a Cu layer positioned between first and second layers comprising metallic ferromagnetic layers and/or alloys containing Ni, Fe, Co, or combinations thereof, selectively;

applying a Cu specific etchant to said Cu layer to space an end surface of said Cu layer apart from the plane of said detection surface by a spacing dimension of between 30 and 100 nm;

applying a protective coating to said Cu layer end surface to inhibit corrosion;

directing an electric current through said GMR sensor, wherein on the order of 50% of said current passes through said Cu layer; and monitoring said current to detect variations of the resistance of said GMR sensor, and using said resistance variations to determine data information stored on said tape.

6. The method of claim 5, wherein:

a pole tip recession on the order of 10 nm is formed at the ends of said first and second layers.

7. The method of claim 6, wherein:

said protective coating is applied to said Cu layer end surface by a technique selected from a group of techniques that include mechanical entrainment, electrolytic plating and electroless plating.

8. The method of claim 7, wherein:

a protective coating comprising BTA is applied to said Cu layer end surface by means of electroless plating.

* * * * *